US008467759B2

(12) United States Patent
Pera et al.

(10) Patent No.: US 8,467,759 B2
(45) Date of Patent: *Jun. 18, 2013

(54) ADJACENT CHANNEL OPTIMIZED RECEIVER

(75) Inventors: Robert J. Pera, San Jose, CA (US); Lance D. Lascari, Rochester, NY (US)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,610

(22) Filed: Apr. 17, 2012

(65) Prior Publication Data
US 2012/0202444 A1 Aug. 9, 2012

Related U.S. Application Data

(63) Continuation of application No. 12/618,690, filed on Nov. 13, 2009, now Pat. No. 8,219,059.

(51) Int. Cl.
*H04B 1/10* (2006.01)
*H04B 7/00* (2006.01)
(52) U.S. Cl.
USPC ............................ 455/266; 455/307; 455/314
(58) Field of Classification Search
USPC ................. 455/266, 280, 293, 296, 307, 314, 455/318, 323, 334, 338, 339, 340
See application file for complete search history.

(56) References Cited

U.S. PATENT DOCUMENTS

| | | | | | |
|---|---|---|---|---|---|
| 5,303,413 | A | * | 4/1994 | Braegas | 455/266 |
| 5,307,515 | A | * | 4/1994 | Kuo et al. | 455/295 |
| 5,339,455 | A | * | 8/1994 | Vogt et al. | 455/266 |
| 5,564,093 | A | * | 10/1996 | Matsumoto | 455/266 |
| 5,758,296 | A | * | 5/1998 | Nakamura | 455/575.7 |
| 7,636,559 | B2 | * | 12/2009 | Magnusen et al. | 455/266 |
| 2005/0136880 | A1 | * | 6/2005 | Subasic et al. | 455/334 |
| 2007/0238419 | A1 | * | 10/2007 | Dubois et al. | 455/78 |
| 2008/0051053 | A1 | * | 2/2008 | Fedan | 455/296 |
| 2008/0309535 | A1 | * | 12/2008 | Le Guillou | 341/143 |

* cited by examiner

*Primary Examiner* — Nguyen Vo
(74) *Attorney, Agent, or Firm* — Antero & Tormey LLP; Pete Tormey

(57) ABSTRACT

The present invention offers significant improvements in the performance of a radio receiver operating in an environment with high desired band interference. The present invention comprises a high selectivity RF circuit that is located between the antenna and the radio receiver, and utilizes superheterodyne technology to filter adjacent channel interference in the desired band frequency spectrum. This type of interference is problematic for IEEE 802.11 radio receivers that are implemented with the popular direct conversion radio receiver architectures. The present invention may be utilized in many types of radio receivers.

9 Claims, 13 Drawing Sheets

Channel Assignments per Regulatory Domain

The following channels are available (the 4 digit numbers in this table represent the center frequency in MHz, for each of the channels listed):

| Channel ID | FCC | ETSI | France | Japan |
|---|---|---|---|---|
| 1 | 2412 | 2412 | * | * |
| 2 | 2417 | 2417 | * | * |
| 3 | 2422 | 2422 | * | * |
| 4 | 2427 | 2427 | * | * |
| 5 | 2432 | 2432 | * | * |
| 6 | 2437 | 2437 | * | * |
| 7 | 2442 | 2442 | * | * |
| 8 | 2447 | 2447 | * | * |
| 9 | 2452 | 2452 | * | * |
| 10 | 2457 | 2457 | 2457 | * |
| 11 | 2462 | 2462 | 2462 | * |
| 12 | * | 2467 | 2467 | * |
| 13 | * | 2472 | 2472 | * |
| 14 | * | * | * | 2484 |

All Frequencies are in MHz
* = not assigned

FIG. 2

| Channel ID | Information Signal Carrier Frequency | Programmable Local Oscillator | IF |
|---|---|---|---|
| 1 | 2412 | 2038 | 374 |
| 2 | 2417 | 2043 | 374 |
| 3 | 2422 | 2048 | 374 |
| 4 | 2427 | 2053 | 374 |
| 5 | 2432 | 2058 | 374 |
| 6 | 2437 | 2063 | 374 |
| 7 | 2442 | 2068 | 374 |
| 8 | 2447 | 2073 | 374 |
| 9 | 2452 | 2078 | 374 |
| 10 | 2457 | 2083 | 374 |
| 11 | 2462 | 2088 | 374 |

All Frequencies are in MHz

FIG. 5

ADJACENT CHANNEL OPTIMIZED RECEIVER

PRIORITY CLAIM

This application is a continuation of U.S. patent application Ser. No. 12/618,690, entitled Adjacent Channel Optimized Receiver, filed on Nov. 13, 2009 by the same inventors and is fully incorporated herein by reference.

FIELD OF THE INVENTION

This invention generally relates to wireless communications, and more specifically, microwave radio equipment, such as IEEE 802.11 radios.

BACKGROUND OF THE INVENTION

FIG. 1 illustrates in frequency spectrum 100 a typical environment for a WLAN environment with ACI. As shown, the frequency spectrum 101 of the information signal has sufficient signal power to achieve an appropriate signal to noise ratio (SNR) compared with the interference 102 that is located in the desired band. The performance of a radio is also determined by the signal-to-interference ratio (S/I or SIR) 105, which is defined as the ratio of the data signal to the interference signal. SIR 105 is often more critical to radio performance than the signal-to-noise (SNR) ratio 104. The design of wireless systems, including the wireless system's RF sub-system and digital filtering, may greatly affect the performance of the wireless system and the achievement of an acceptable SIR and SNR.

Consider frequency spectrum 100 with the presentence of strong ACI. Adjacent to the frequency spectrum 101 of the information signal is the frequency spectrum of the adjacent channel interference 103. In a controlled indoor environment, the adjacent channel interference 103 is likely "out-of-band" interference. "Out-of-band" refers to frequencies that are not within the frequency band or channel of the desired channel or signal. Hence, the out-of-band filters of the radio receiver may be sufficient to remove the out-of band ACI.

However, if the frequency spectrum of adjacent channel interference 103 is "in-band" relative to the desired channel associated with the frequency spectrum 101 of the information signal, then it may be more difficult for the radio receiver to mitigate a strong ACI signal. This describes the challenge that IEEE 802.11 systems and other radio systems need to address in an out door environment. This situation creates a need to filter interferers that are located in the desired band spectrum.

The ability of an RF system to reject interference emanating from adjacent channels is highly dependent upon the receiver architecture. Adjacent channel rejection (ACR) is a measure of how much ACI a receiver may tolerate and continue to provide acceptable performance. One of ordinary skill in the art may recognize that receiver architectures for IEEE 802.11 WLAN systems may be direct conversion or dual conversion. Further, the dual conversion architecture may be implemented as a superheterodyne (superhet) architecture. Although superhet architectures offer performance advantages, the economics of direct conversion architectures has resulted in the majority of the WLAN receiver integrated circuits (IC) to be implemented with a direct conversion architecture.

However, direct conversion receivers have limited filtering capabilities and limited dynamic range. Hence, WLAN systems designed with direct conversion architecture ICs are limited in their ability to mitigate strong desired band ACI.

One of ordinary skill in the art may recognize that with the direct conversion architecture and in a strong ACR environment, the radio may obtain an interference signal at the radio's analog to digital converter in the receiver chain that may be 40 db stronger than an acceptable level. On reason for this situation is that direct conversion architecture may not have the surface acoustic wave (SAW) filter at the intermediate frequency (IF), resulting in an interference signal at the A/D converter in the receiver chain that 40 dB stronger than the acceptable level. Accordingly, the filtering provided by a superhet receiver architecture reduces ACI to permit an acceptable performance for WLAN systems. Direct conversion architectures, however, are generally not able to provide acceptable performance with strong ACI.

Hence, while direct conversion architectures are acceptable for unlicensed indoor environments, they are generally not acceptable for outdoor environments. Given the popularity of low cost WLAN ICs with direct conversion architecture, there is a need to improve these WLAN systems based on direct conversion architectures to permit operation in an outdoor environment with high adjacent channel interferers.

SUMMARY

The present invention offers significant improvements in the performance for a radio receiver operating in an environment with high adjacent channel interference. The present invention comprises a high selectivity RF circuit that is coupled between the antenna and the radio receiver, and filters adjacent channel interference in the desired band frequency spectrum. This type of interference is problematic for IEEE 802.11 radio receivers that are implemented with popular direct conversion radio receiver architectures. The present invention may also be utilized in many types of radio receivers.

The high selectivity RF circuit utilizes superheterodyne technology and comprises channel select filters, a down-converter, up-converter and a programmable local oscillator. The radio signal is down-converted to an intermediate frequency (IF), then filtered by a selected channel select filter, then up-converted back to the carrier frequency of the radio signal. The programmable local oscillator provides a local oscillator signal to the up-converter and the down-converter that permits down-converting the radio signal to an intermediate frequency and subsequently up-converting the signal back to the carrier frequency. The programmable local oscillator receives a control signal coupled from the radio receiver that determines the local oscillator signal, and in turn the IF frequency.

The high selectivity RF circuit comprises selectable channel select filters. The is channel select filter is selected by the radio receiver based on the channel bandwidth and frequency requirements for the communication. For IEEE 802.11n systems, the channel bandwidth may be 5, 10, 20, or 40 MHz. The center frequency of the selectable channel filter is the intermediate frequency. The frequency band may be located at 2.4 GHz or 5 GHz. Typically, the selectable channel filter is a SAW filter. The input and output of the high selectivity RF circuit has an out-of-band filter to remove interferers in the out-of-band spectrum.

Hence, the high selectivity RF circuit filters the one or more desired band interferer signals that are adjacent to the desired channel band of the radio signal and presents a "clean" signal to the input of the radio receiver. The "clean" signal has substantially the same carrier frequency as the original radio signal.

BRIEF DESCRIPTION OF THE DRAWINGS

The components in the figures are not necessarily to scale, emphasis instead being placed upon illustrating the principles of the present invention. In the figures, like reference numerals designate corresponding parts throughout the different views.

FIG. 2 is a table of the channel assignments for the 2.4 GHz, IEEE 802.11 spectrum per regulatory domain.

FIG. 5 is a table of carrier frequencies and programmable local oscillator frequencies for channel assignments supporting a 374 MHz intermediate frequency.

DETAILED DESCRIPTION

Figure 1:
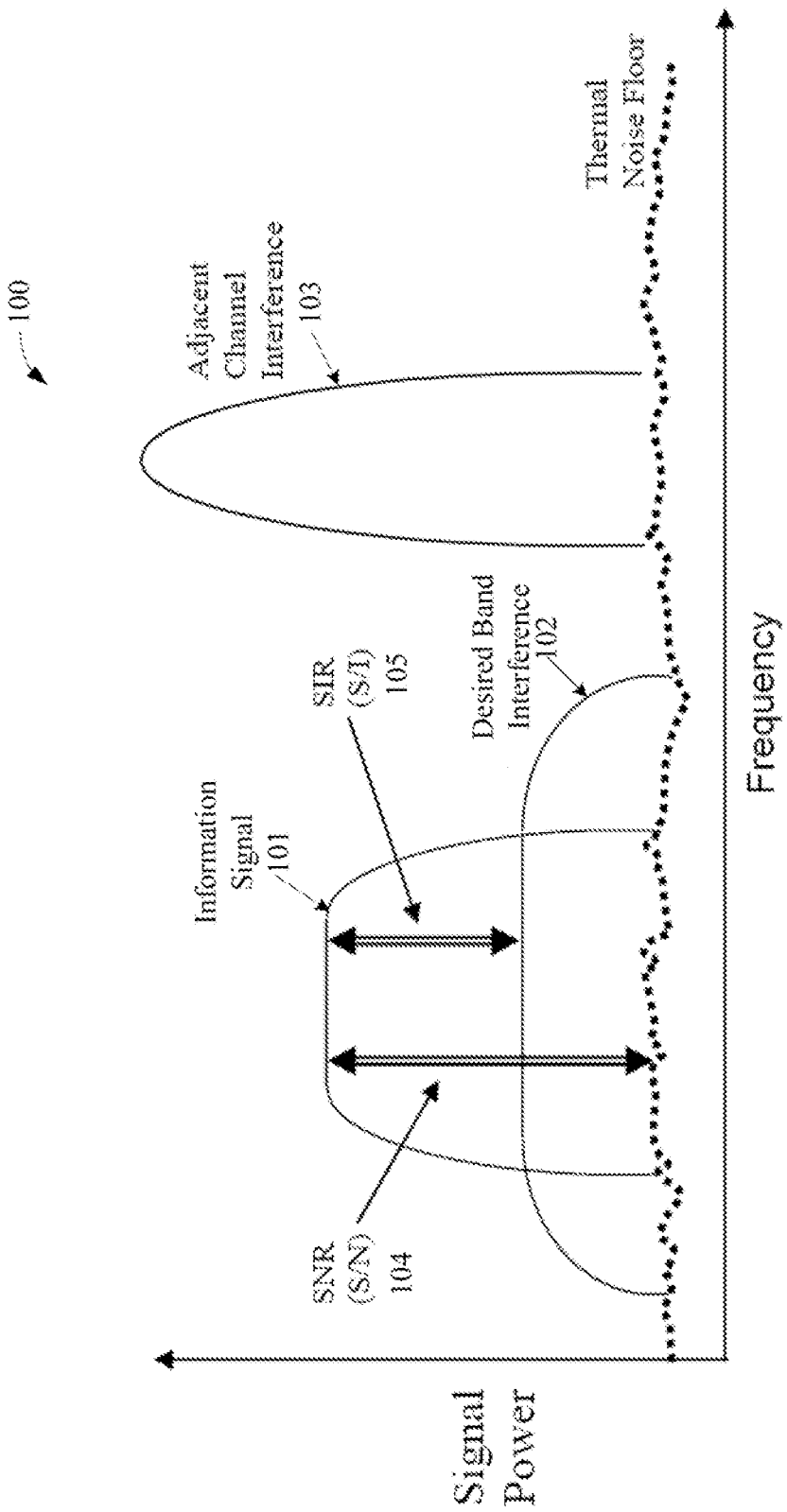
FIG. 1 illustrates a radio frequency band with adjacent channel interference.

Although described in the context of an IEEE 802.11 Wi-Fi microwave system, the systems disclosed herein may be generally applied to any radio receiver.

DEFINITIONS

Read this application with the following terms and phrases in their most general form. The general meaning of each of these terms or phrases is illustrative, not in any way limiting.

Desired band—The frequency band or spectrum where the specified service is permitted to operate. For example, for IEEE 802.11b systems, the "desired band" spectrum is the spectrum encompassing channels permitted by the IEEE 802.11b radio standard. For the U.S. this spectrum includes the 11 channels located within the band 2412 MHz to 2462 MHz (See FIG. 2). IEEE 802.11 system may also operate in other bands such as 5.0 GHz frequency band. The desired band spectrum is also referred to as the in-band spectrum. A filter that filters the desired band spectrum is referred to as a "band select filter". "Frequency band" or "frequency spectrum" may be used interchangeable, and these terms also have the same meaning as the term "band" or "spectrum".

Out-of-band spectrum—The frequency band or spectrum outside of the desired band spectrum. For IEEE 802.11b systems operating in the 2.4 GHz band, the "out-of-band" spectrum encompasses frequencies outside of the 2.4 GHz frequency range. A typical out-of-band filter, filters frequencies outside the frequency band of 2400 MHz and 2484 MHz.

Desired channel—The frequency band or spectrum within the desired band spectrum where a specific channel may operate. For IEEE 802.11n systems, the desired channel bandwidth may be 5, 10, 20, or 40 MHz. A filter that selects the desired channel bandwidth is referred to as a "channel select filter". For IEEE 802.11b systems operating in the 2.4 GHz band, the channel assignments are within the 2412 MHz to 2462 MHz frequency range and the channel bandwidth is 5 MHz. The specific channel assignments for IEEE 802.11b in the 2.4 GHz band are included in FIG. 5.

Radio signal—The radio frequency signal received by the antenna of a radio receiver. The radio signal comprises the information signal and the interferer signals.

RF signal—A signal operating at radio frequencies. An RF signal may be the radio signal or may be a signal located in the high selectivity RF circuit.

Information Signal—The portion of the RF signal that comprises the desired signal or information to be received.

Interferer signals—The portion of an RF signal that does not comprise any components of the information signal. The interferer signals may be desired band (in-band) or out-of-band. Desired band interferer signals may be located within a desired channel band, or may be located adjacent to a desired channel band. A strong interferer signal has a signal strength that is greater than the information signal, and a lesser interferer has a signal strength that is less than the information signal.

IEEE 802.11—Refers to the following standards, IEEE 802.11n (2.4 GHz and 5 GHz bands), IEEE 802.11b (2.4 GHz band), IEEE 802.11g (2.4 GHz band), and IEEE 802.11a (5 GHz band). There is also a public safety band available in the U.S. operating with a 4.9 GHz band. Refer to appropriate IEEE standard for further details. For example, IEEE Std 802.11-2007.

Superhet Receivers

As described in the Background of the Invention, a superheterodyne or superhet architecture in the radio receiver may provide superior performance, especially to address adjacent channel interference (ACI). Basically, heterodyne means to mix two frequencies together to produce a beat frequency, or the difference between the two frequencies. Amplitude modulation is an example of a heterodyne process where the information signal is mixed with the carrier to produce side bands. The side-bands occur at precisely the sum and difference frequencies (beat frequencies) of the carrier and the information signal. Normally the beat frequency associated with the lower side band is utilized in the radio system. The center frequency of the lower side-band is the intermediate frequency (IF).

When the radio system utilizes the lower side-band, a superheterodyne process is implemented. That is, the term superheterodyne may refer to creating a beat frequency that is lower that the original signal. Hence, superheterodyning mixes another frequency with the carrier frequency of the information signal so as to reduce the signal frequency prior to processing.

As an example, for IEEE 802.11b systems, the received carrier frequencies include channels in the frequency band from 2412 MHz to 2462 MHz. (See FIG. 2). Hence, a received signal with a carrier of 2412 MHz may be mixed with a synthesized reference clock of 2038 MHz to generate an IF of 374 MHz. (See FIG. 5).

One advantage of superheterodyning is an improvement in signal isolation by arithmetic selectivity, i.e. increasing the fractional bandwidth. This is the bandwidth of a device divided by its center frequency. For example, a device that has a bandwidth of 2 MHz with center frequency 10 MHz may have a fractional bandwidth of $2/10$, or 20%.

The ability to isolate signals, or reject unwanted ones, is a function of the receiver bandwidth. For example and without limitation, the band-pass filter in the tuner is what isolates the desired signal from the adjacent ones. In reality, there are frequently sources that may interfere with the radio signal. The FCC makes frequency assignments that generally prevent this situation. Depending on the application, one might have a need for very narrow signal isolation. If the performance of a band-pass filter isn't sufficient to accomplish this, the performance may be improved by superheterodyning.

Frequently, the receiver bandwidth is some fraction of the carrier frequency. If the receiver has a fractional bandwidth of 2% and is tuned to a center frequency of 850 kHz, then only signals within the range from 2% above and below 850 kHz may pass. In this case, the range is from 833 to 867 kHz.

Arithmetic selectivity takes that fraction and applies it to the reduced frequency (i.e. the IF). For a fixed IF of 452 kHz, that means signals which are superheterodyned to the range of 443 to 461 kHz may pass. Up-converting back up into the carrier band, only carrier frequencies in the range of 841 to 859 kHz may pass. Recall that the local oscillator is set to reduce the 850 kHz to 452 kHz (i.e. needs to be set at 398 kHz). Thus, the 850 kHz is superheterodyned to 452 kHz. Any adjacent signals are also superheterodyned while maintaining the same frequency relationship above or below the original signal.

For example, suppose there is an interfering signal at 863 kHz while the radio is tuned to 850 kHz. A conventional 2% fractional bandwidth receiver may pass 833 to 867 kHz and so the interfering signal also passes. The superheterodyne receiver mixes the interfering signal and the radio signal with 398 kHz to produce the desired signal at 452 kHz and the interference at 465 kHz. At 2% fractional bandwidth, the IF section may only passes 443 to 461 kHz, and therefore the interference is now suppressed. Hence, the superheterodyne receiver is more selective. The reason is simple: it operates at a smaller frequency, so the 2% fractional bandwidth actually involves a smaller range. That is why it is called arithmetic selectivity. Bandwidths that are expressed as a percentage are smaller when the center frequency is smaller.

In summary, in cases where selectivity is important or the frequency is very high (like radar) then superheterodyning may greatly improve performance. Superheterodyne receivers reduce the signal frequency by mixing in a signal from a local oscillator to produce the intermediate frequency (IF). Superheterodyne receivers have better performance because the components may be optimized to work at a intermediate frequency, and may take advantage of arithmetic selectivity. These principles are applied to the present invention.

Although the aforementioned technical benefits of superhet receivers are known to one of ordinary skilled in the art, superhet receiver are more expensive than some alternative radio receiver architectures. A direct conversion radio receiver, also known as homodyne, synchrodyne, or zero-IF receiver, is a radio receiver design that demodulates incoming signals by mixing it with a local oscillator signal synchronized in frequency to the carrier of the information signal. The desired demodulated signal is thus obtained immediately by low-pass filtering the mixer output.

Because of the economic benefits, direct conversion radio receivers have become the standard for many IC radio receivers, including radio receiver implementing IEEE 802.11. Unfortunately, direct conversion radio receivers usually do not provide robust performance in an environment with a strong desired band interferer. As previously noted, IEEE 802.11 radio receiver in outdoor environments are particular vulnerable to strong desired band interferer.

High Selectivity RF Circuit

A method of improving the performance of a radio receiver comprises "cleaning-up" the desired band spectrum and presenting the resulting signal to the radio receiver. Such a method may be implemented by utilizing the principle of superheterodyning in a high selectivity RF circuit. In the high selectivity RF circuit the RF signal is down-converted to IF and "cleaned up", i.e. filtered to remove interferers outside of the desired (i.e. selected) channel. Then, the RF signal is up-converted back to a carrier frequency that is substantially the same as the radio signal carrier frequency and the up-converted RF signal is coupled to the input of the radio receiver. Hence the radio receiver receives an information signal that may not include strong interferers and other undesired signals.

The high selectivity RF circuit comprises channel select filters that have values equal to the desired channel bandwidth. The radio has a priori knowledge of the desired frequency and bandwidth of operation and provides control signal information on these elements to the high selectivity RF circuit. Hence, the radio receiver control signals specify the desired band and channel, in order to determine the IF frequency, and the bandwidth, in order to select the appropriate channel select filter.

Figure 3A:
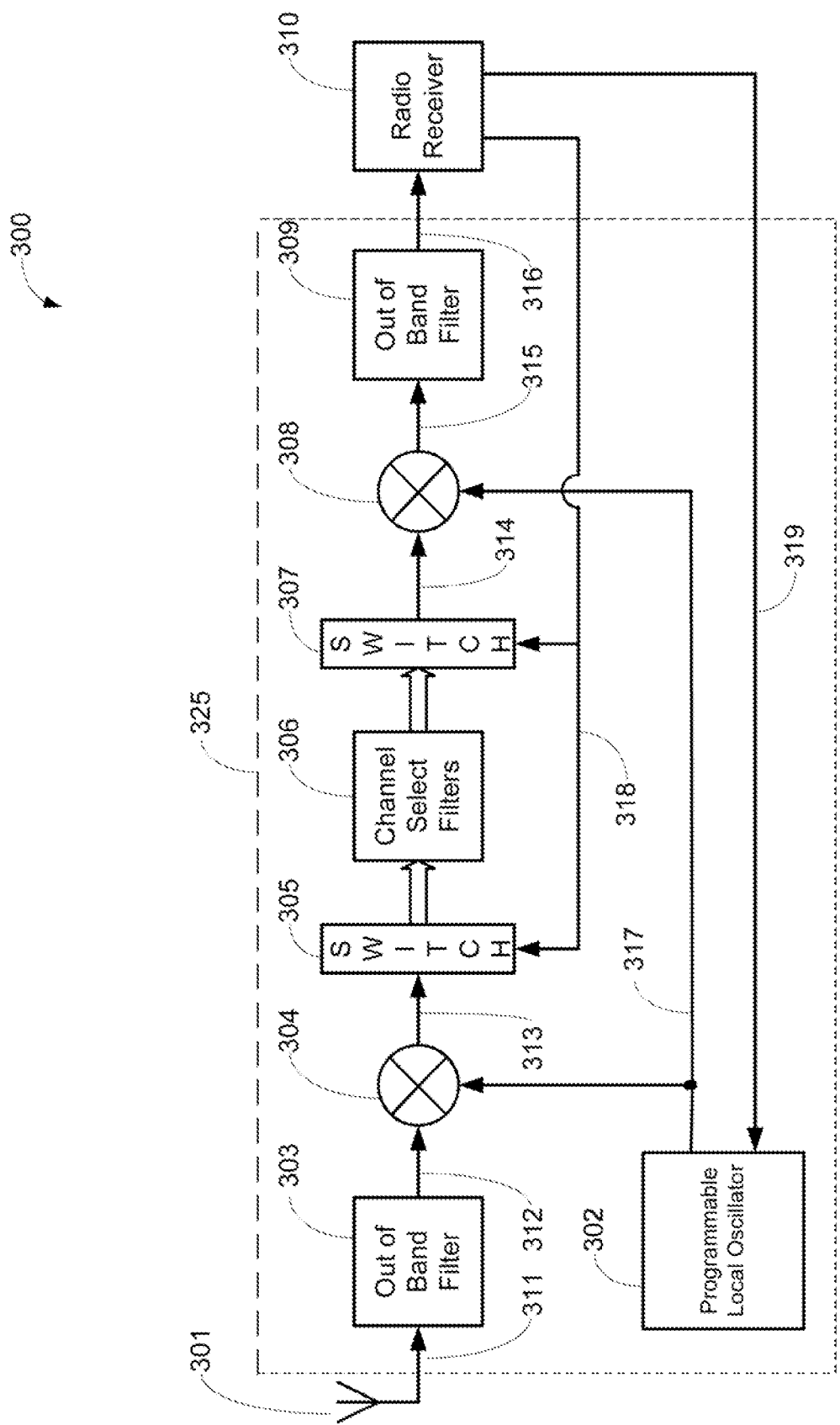
FIG. 3A illustrates a high selectivity RF circuit in accordance with an embodiment of the present invention.
Figure 4:
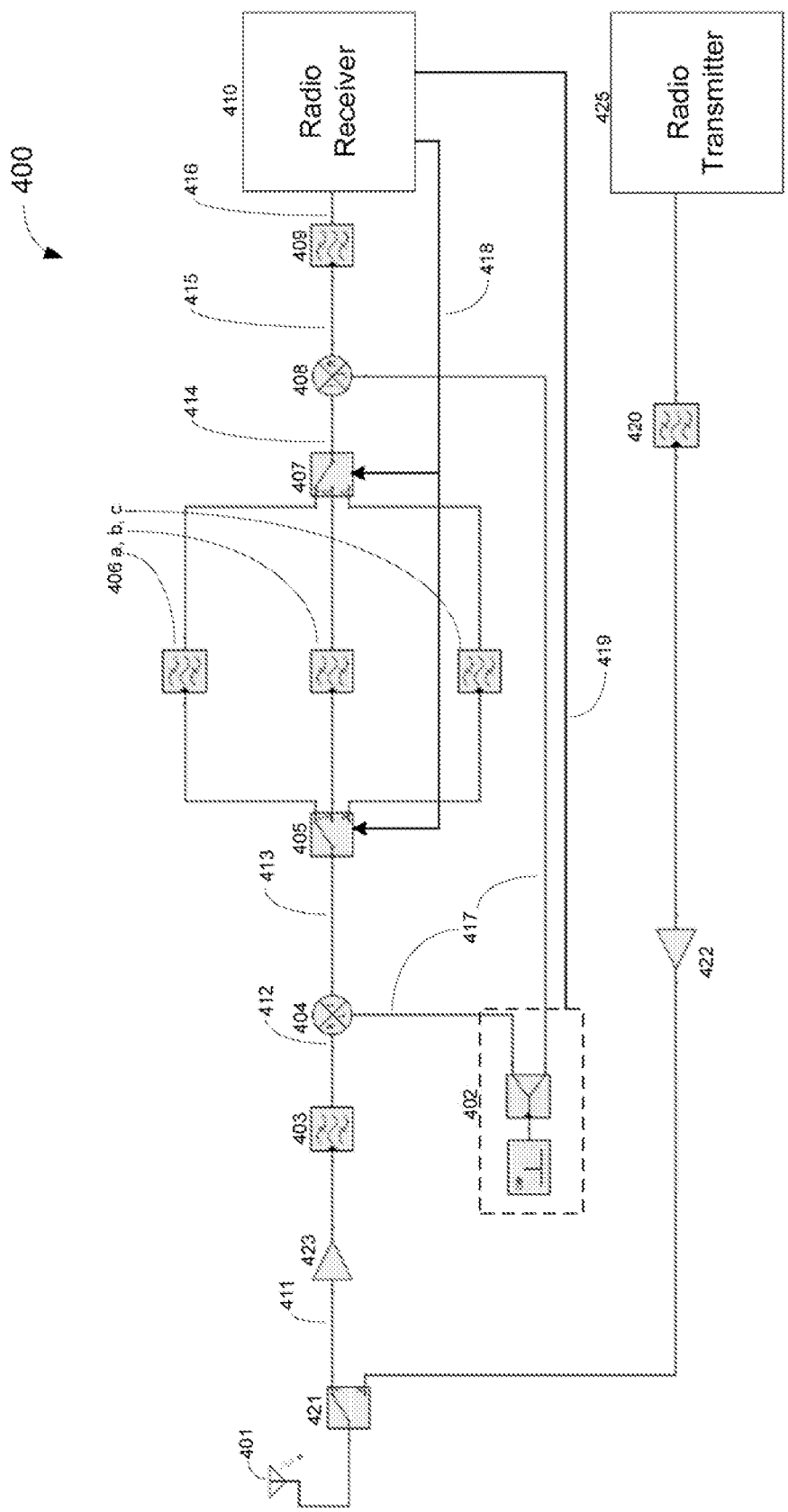
FIG. 4 illustrates IEEE 802.11 high selectivity RF circuit in accordance with an implementation of the present invention.
Figure 6:
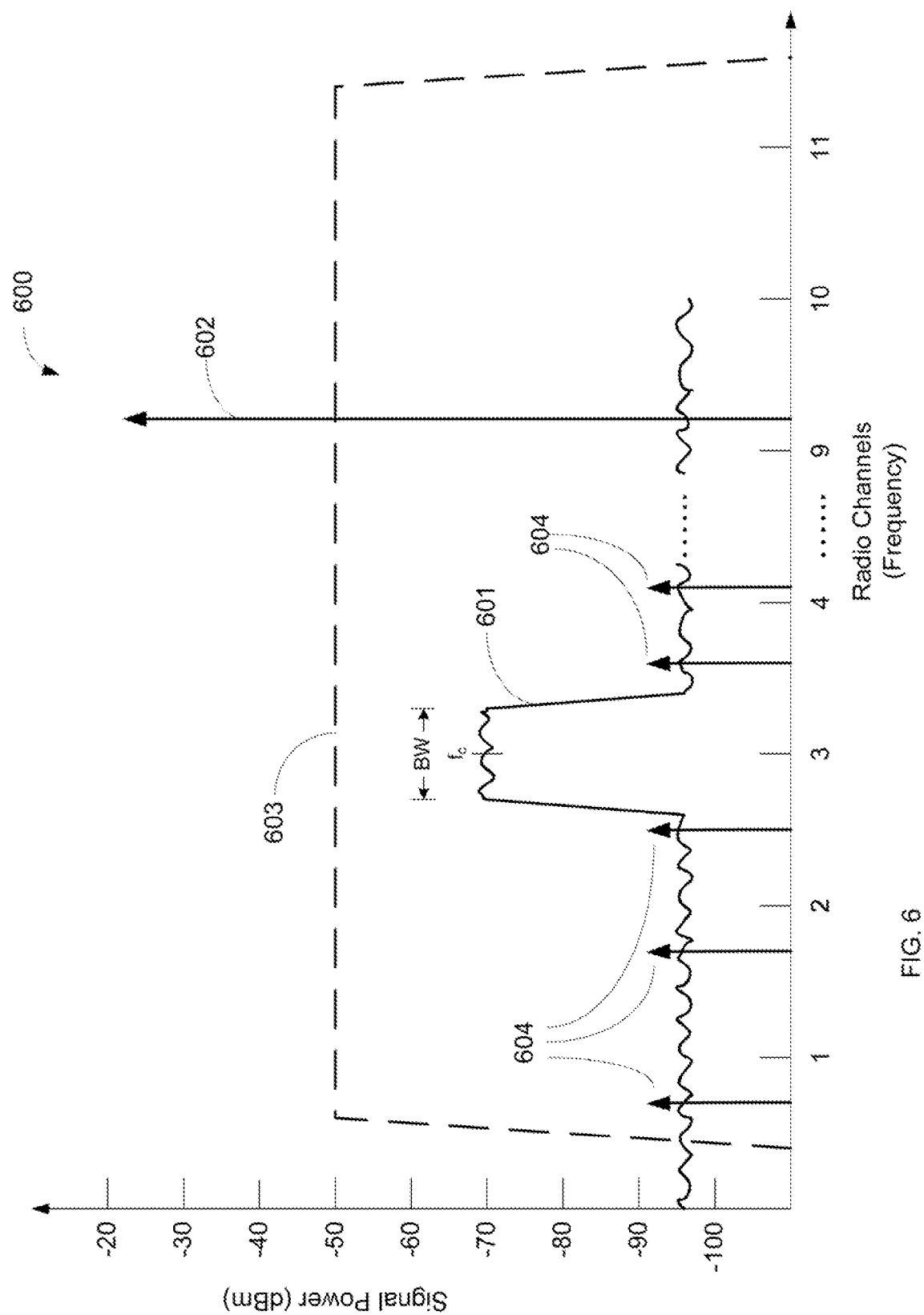
FIG. 6 illustrates a frequency spectrum diagram with a radio channel and an adjacent channel desired band strong interferer.

FIG. 3A illustrates an embodiment of the present invention of a radio system 300 using a high selectivity RF circuit 325. The high selectivity RF circuit 325 comprises the elements illustrated on FIG. 3A, excluding antenna 301 and radio receiver 310. A specific implementation of this embodiment for IEEE 802.11 is illustrated in FIG. 4. Relative to FIG. 3A, radio signal 311 is a radio signal that is received on antenna 301. Radio signal 311 comprises the information signal, desired band interferer signals and out-of-band interferer signals. The information signal is centered at the carrier frequency. Radio signal 311 is then coupled to an out-of-band filter 303 that removes undesired signals that are in the out-of-band spectrum and generates radio signal 312. FIG. 6 illustrates frequency spectrum 600, the frequency spectrum of radio signal 312. As shown, the dotted line spectrum 603 represents the desired band spectrum created by out-of-band filter 303. Undesirable signals outside this band have been removed and are no long a concern for the signal processing.

Within the desired band spectrum is the spectrum for the permitted carrier channels. For example, on FIG. 6, there are 11 radio or carrier channels indicated, representing the 11 channels in the IEEE 802.11b standard. The information signal is illustrated on FIG. 6 by spectrum 601 with the center frequency f.sub.c of radio channel 3 to and bandwidth BW. At this point in the circuit, the center frequency of the information signal is also referred to as the carrier frequency. Also within the desired band spectrum is a strong interferer 602 and lesser interferers 604.

Returning to FIG. 3A, radio signal 312 is coupled to a mixer 304. Mixer 304 down-converts the radio signal 312 and is also described as down-converter mixer 304. Similarly, mixer 308 is also described as up-converter mixer 308. The local oscillator for mixer 304 is provided by programmable local oscillator 302 that couples local oscillator signal 317 to mixer 304 and mixer 308. The radio receiver 310 sends to the programmable local oscillator 302 on control signal 319 information specifying the frequency of the carrier channel. Control signal 319 may be referred to as the first control signal.

Programmable local oscillator 302 is a common synthesized reference that generates local oscillator signal 317 which is coupled to the two frequency conversion stages. Since the up-converter mixer 308 and the down-converter mixer 304 receive the same mixing signal, there are effectively no net changes in the conversion relative to the carrier frequency. The local oscillator signal 317 mixes with a radio signal 312 to generate a down-converted signal and also mixes with filtered signal 314 to generate an up-converted signal.

Local oscillator signal 317 may be synthesized and agile, and may be a sinusoidal signal. Programmable local oscillator 302 may be implemented with a phase locked loop with programmable dividers, or a direct digital synthesis (DDS) circuit, or other suitable circuit.

Figure 7:
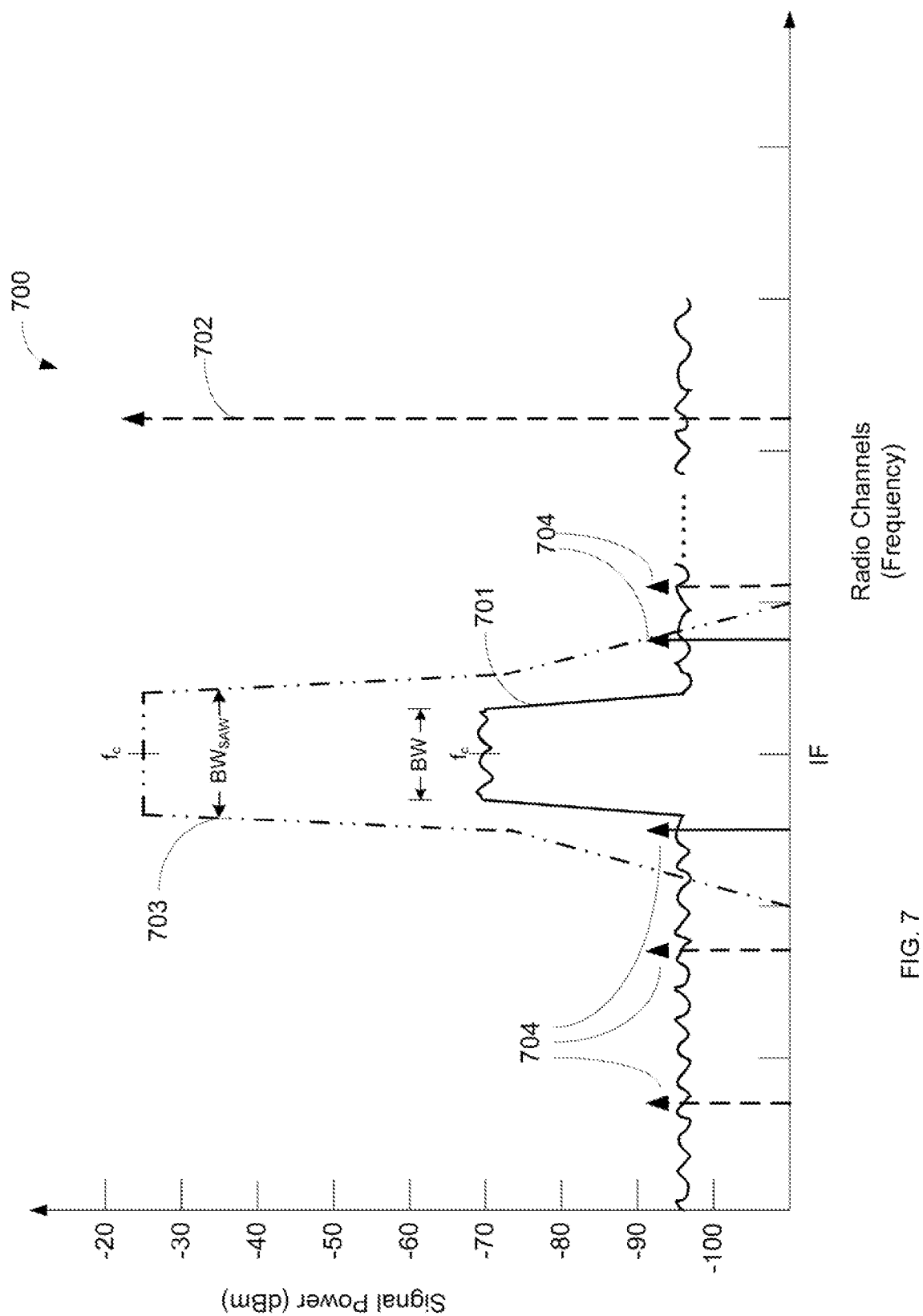
FIG. 7 illustrates a frequency spectrum diagram where the carrier channel, comprising a spectrum for the information signal and an adjacent channel interferer signal that has been down-converted to an intermediate frequency in accordance with an embodiment of the present invention.

The output from mixer 304 is down-converted signal 313. Down-converted signal 313 is centered at the intermediate frequency IF and is represented by spectrum 701 on FIG. 7. Therefore, FIG. 7 illustrates the frequency spectrum 700, including down-converted signal 313 and filtered signal 314 in the IF region of the spectrum. Frequency spectrum 700 comprises the spectrum 701 and strong interferer 702 and lesser interferers 704. These signals have been down-converted by mixer 304. The IF frequency is selected in order to optimize the performance of radio receiver 310 while to minimize the cost of the high selectivity RF circuit. This objective is achieved by selecting a low frequency as possible in order to minimize the circuit cost. Conversely, a higher frequency is desirable in order to efficiently remove intermodation products generated in the conversion process and other spurious desired band interferers from the spectrum.

The down-converted signal 313 is coupled to a switch 305 that is controlled by the radio receiver 310. The radio receiver 310 sends information on control signal 318 to switch 305 and switch 307 containing the specification for the channel bandwidth for the subsequent communication. Control signal 318 may be referred to as a second control signal. Based on the bandwidth information provided in control signal 318, switch 305 and switch 307 select a channel select filter of channel select filters 306 that corresponds to the channel bandwidth of the desired channel. The down-converted signal 313 subsequently is coupled through the appropriate channel select filter. Multiple channel select filters are provided in channel select filters 306 in order to select the filter that best matches the channel bandwidth and provides the highest performance.

With a superhet receiver, the selected channel filter may be SAW filters since SAW filters provide excellent performance. One characteristic of SAW filters is very sharp skirts at the high frequency and low frequency of the spectrum. The spectrum 703 of the SAW filter is illustrated in FIG. 7. As shown, the bottom of the spectrum skirts (see 703) of the SAW filter has a greater bandwidth than at the top of the filter. The bandwidth of SAW filter is $BW_{SAW}$ and bandwidth $BW_{SAW}$ is at least as wide as the bandwidth BW of frequency spectrum 710 for the information signal. Note on FIG. 7 that the center frequency $f_c$ for the SAW filter represented by spectrum 703 and the spectrum 701 that represents the information signal, are substantially the same value as the IF frequency.

After being filtered by SAW filter, the frequency spectrum 700 may only comprise spectrum 701, representing the information signal, plus any lesser interferers 704 that are located within the skirts of the SAW filter. The strong interferer 702 and lesser interferers 704 that are outside of the SAW filter skirts have been effectively to filtered from the desired band spectrum. This filtered signal is located on FIG. 3A as filtered signal 314. Hence, channel select filters 306 filters the one or more desired band interferer signals that are adjacent to a desired channel and generates a filtered radio signal. That is, the desired band interferer signals that are outside of the selected channel bandwidth $BW_{SAW}$ are filtered.

In order to interface with the radio receiver, filtered signal 314 is up-converted by mixer 308. Mixer 308 "mixes" filtered signal 314 with local oscillator signal 317 from the programmable local oscillator 302 and generates up-converted RF signal 315, which is centered at the carrier frequency. Mixer 308 is also described as an up-converter. Note that local oscillator signal 317 is also coupled to mixer 304. Thus, up-converted RF signal 315 has substantially the same carrier frequency as radio signal 311.

Up-converted RF signal 315 is now coupled to a second out-of-band filter 309. The first out-of-band filter 303 and second out-of-band filter 309 provides substantially the same filtering. The principle purpose of the second out-of-band filter 309 is to remove out-of-band mixing products and local oscillator signals that may have been generated in the up-converting and down-converting processes. The output of the out-of-band filter 309 is signal 316 which is coupled to the input of the radio receiver.

Figure 8:
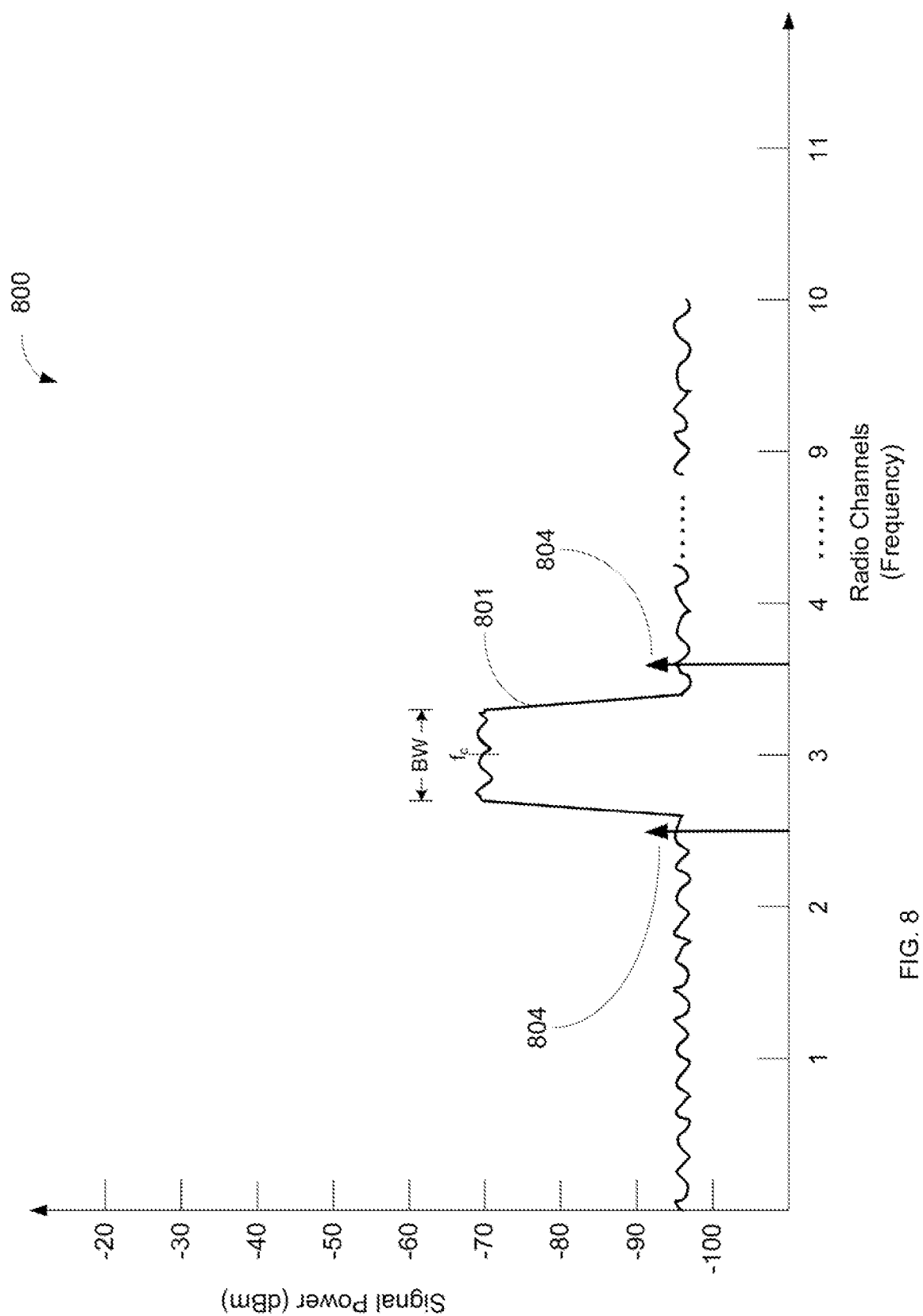
FIG. 8 illustrates a frequency spectrum diagram where the carrier channel, comprising a spectrum for the information signal that has been up-converted to the original carrier frequency in accordance with an embodiment of the present invention.

The spectrum of signal 316 is illustrated in frequency spectrum 800 in FIG. 8. As shown, the frequency spectrum is very "clean". That is, the strong desired band interferer has been filtered out and most of the lesser interferers have been removed. The frequency spectrum 800 may only contains the information signal represented by frequency spectrum 801 and some lesser interferers 804. As shown, the information signal is centered on the radio channel 3 and has a bandwidth BW. Accordingly, this "clean" spectrum may be processed very efficiency by a direct conversion radio receiver.

Figure 3B:
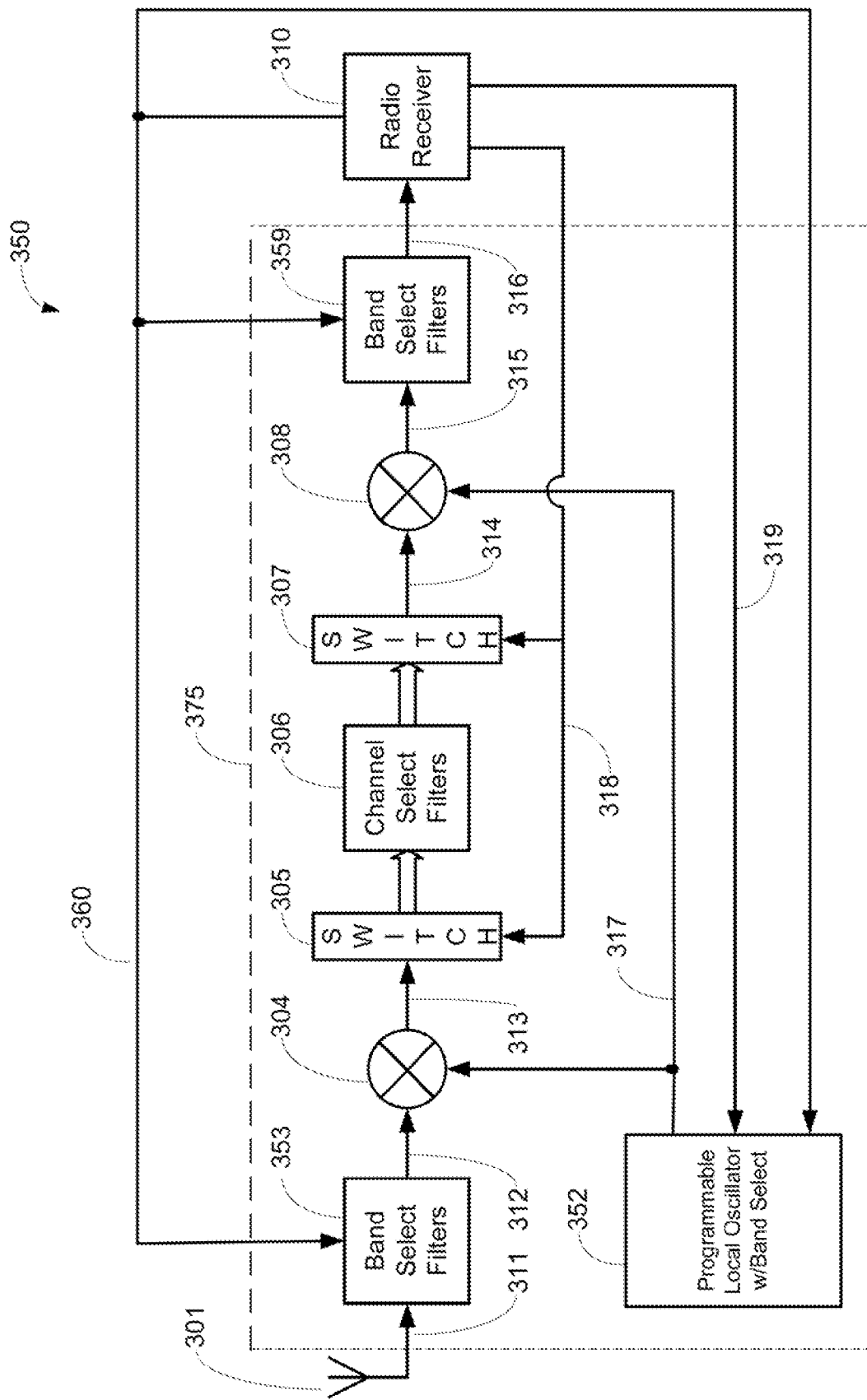
FIG. 3B illustrates a high selectivity RF circuit in accordance with another embodiment of the present invention.

In another embodiment, radio system 350 of the high selectivity RF circuit 375 is illustrated in FIG. 3B. In this radio system 350, the out-of band filtering is provided by band select filters 353 and 359. Band select filters 353 and 359 comprise to more than one filter and permits the high selectivity RF circuit 375 to select the desired band. As illustrated in FIG. 3B, control signal 360 selects the value of the band select filter in band select filters 353 and band select filters 359. For example, the band select filters 353 and 359 may comprise filters for the 2.4 GHz and 5 GHz bands. Control signal 360 may be referred to as a third control signal. Hence, the is first band select filters 353 and the second band select filters 359 receive a third control signal 360 from the radio receiver 310, and the third control signal 360 selects the desired band.

The selected filter in band select filters 353 may be referred to as a first out-of-band filter. The selected filter in band select filters 359 may be referred to as a second out-of-band filter.

The first band select filters 353 and second band select filters 359 provides substantially the same filtering.

Control signal 360 is also coupled to programmable local oscillator w/band select 352. Programmable local oscillator w/band select 352 has the functionality to generate the local oscillator signal 317, in order to generate the appropriate IF.

As in radio system 300, the radio receiver 310 sends a message on control signal 318 to switch 305 and switch 307 containing the specification for the channel bandwidth for the subsequent communication. Based on this message, switch 305 and switch 307 select the channel select filter that corresponds to the channel bandwidth. Other elements of radio system 350 operate in a similar manner as in radio system 300.

An implementation of the embodiment of FIG. 3A is illustrated in FIG. 4 with circuit 400. This circuit supports an IEEE 802.11 WLAN system. FIGS. 3A, 3B and FIG. 4 are labeled such that the last two digits of the element numbers represent the equivalent functions. For example, antenna 301 on FIG. 3A is equivalent to antenna 401 on FIG. 4.

The received radio signal is has a spectrum as illustrated in FIG. 6 where the information signal is radio channel 3 with a carrier frequency of 2422 MHz and is represented by spectrum 601. Also within the spectrum is a strong interferer 602 at approximately 2455 MHz, and several lesser interferers 604 in the desired band. In to the FIG. 4 implementation, a VR switch 421 has been incorporated to provide the appropriate multiplexing of the receiver and transmit signals. On the receiver side, a low noise amplifier LNA 423 has been added to amplify the signal 411 prior to the signal 411 being input to the out-of-band filter 403. For example, for WLAN operating in the 2.4 GHz spectrum, the out of band filter may filter signals outside of the frequency band of approximately 2400 MHz to 2484 MHz.

The filtered signal 412 is subsequently down-converted by mixer 404 with local oscillator signal 417 from the programmable local oscillator 402. The radio receiver 410 provides to the programmable local oscillator 402 the carrier channel frequency information on control signal 419. FIG. 5 provides a table of the information signal's carrier frequency and corresponding frequencies mixed from the programmable local oscillator 402 for the 2.4 GHz, IEEE 802.11 frequency band. Note that the programmable local oscillator 402 provides local oscillator signal 417 that mixes with the filtered signal 412 to generate an IF of 374 MHz. Hence, if the signal received at antenna 401 (and signals 411 and 412) has a carrier frequency of 2422 GHz, then the programmable local oscillator 402 provides a local oscillator signal 417 with a frequency of 2048 MHz.

The IF is selected in order to provide the optimal benefits considering the lower circuit cost of the high selectivity RF circuit by utilizing a low IF and the higher performance of the radio receiver by using a higher IF in order to readily filter out "junk" signals, for example intermodulation signal products.

The down-converted IF signal 413 is coupled to switch 405, which is controlled by the radio receiver 410. The radio receiver 410 provides the information on control signal 418 relative to the channel bandwidth of the subsequent communication. Accordingly, the signal 413 is switched to the appropriate channel select SAW filter, 406a, 406b or 406c. For IEEE 802.11n, the bandwidths of these filters are a combination of 5, 10, 20 and 40 MHz, and have a center frequency that is the same value as the IF. For example, as illustrated in FIG. 7 where the center frequency $f_c$ is the IF, i.e. 374 MHz, and the $BW_{SAW}$ is 5 MHz, and the bandwidth BW of spectrum 701, representing the information signal is less than the 5 MHz to bandwidth.

Signal 414 is filtered by the channel select filter to remove interferer signals in the desired band. Subsequently, signal 414 is coupled to mixer 408 by switch 407. Utilizing the same value for local oscillator signal 417 from the programmable local oscillator 402, the signal 414 is up-converted to the original carrier frequency (2422 MHz) to generate signal 415. Following an out-of-band filter 409, the resulting signal 416 is a "clean" signal with a carrier frequency of 2422 MHz. This spectrum is illustrated in FIG. 8 where radio channel 3 is equal to 2422 MHz. Signal 416 is then coupled to the input of radio receiver 410. If radio receiver 410 is a direct conversion receiver, the receiver may efficiently process signal 416 since desired band adjacent interferers have been removed.

FIG. 4 also illustrated the transmit path of the radio. The IEEE 802.11 transmitter 425 is coupled to an out-of-band filter 420 that is coupled to a power amplifier PA 422. The power boosted signal is coupled to an input of the T/R switch 421, which in turn is coupled to the antenna 401.

Pass Band Tuning

Figure 9:
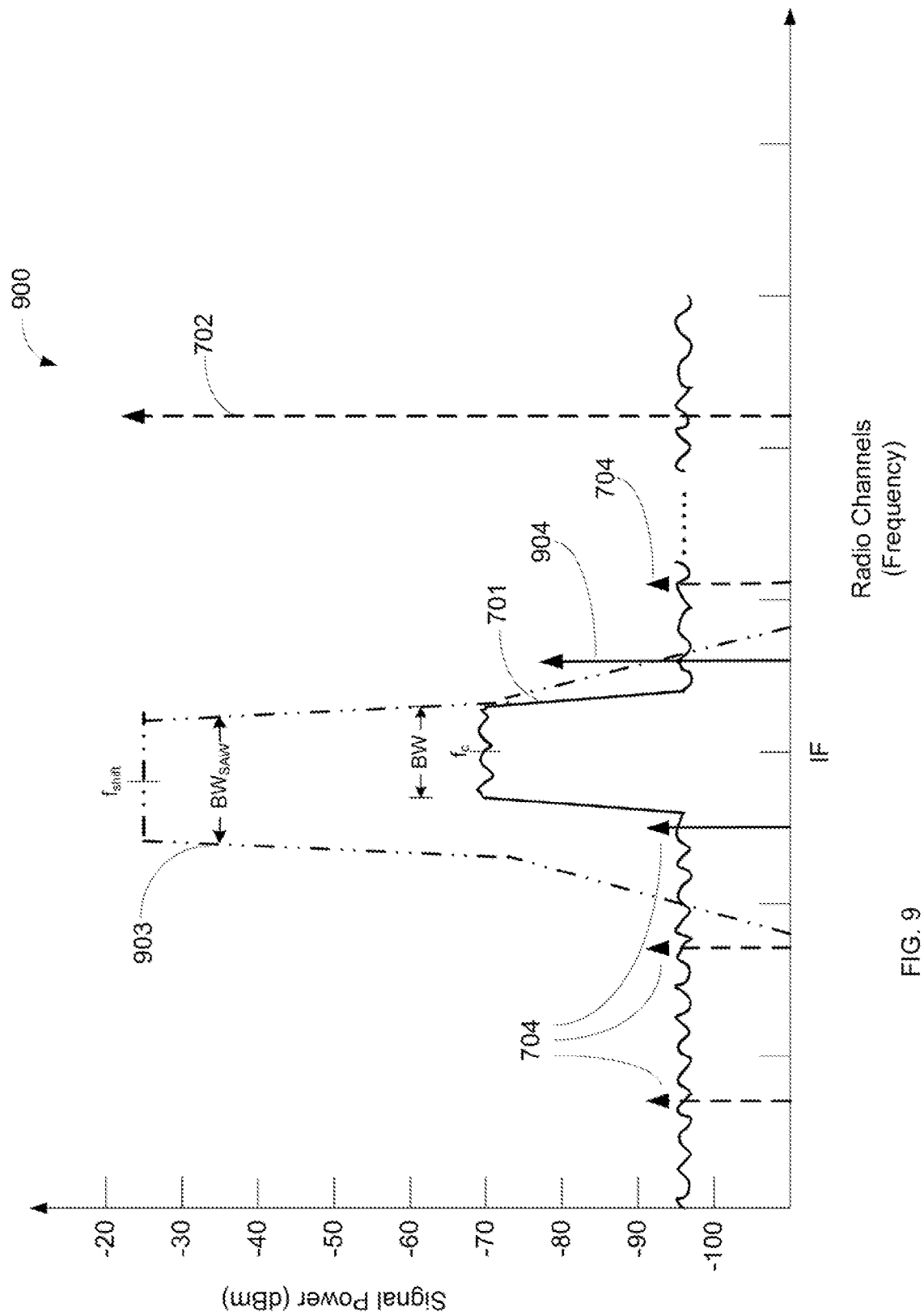
FIG. 9 illustrates the equivalent information as in FIG. 7 with the addition of pass band tuning in accordance with an embodiment of the present invention.
Figure 10:
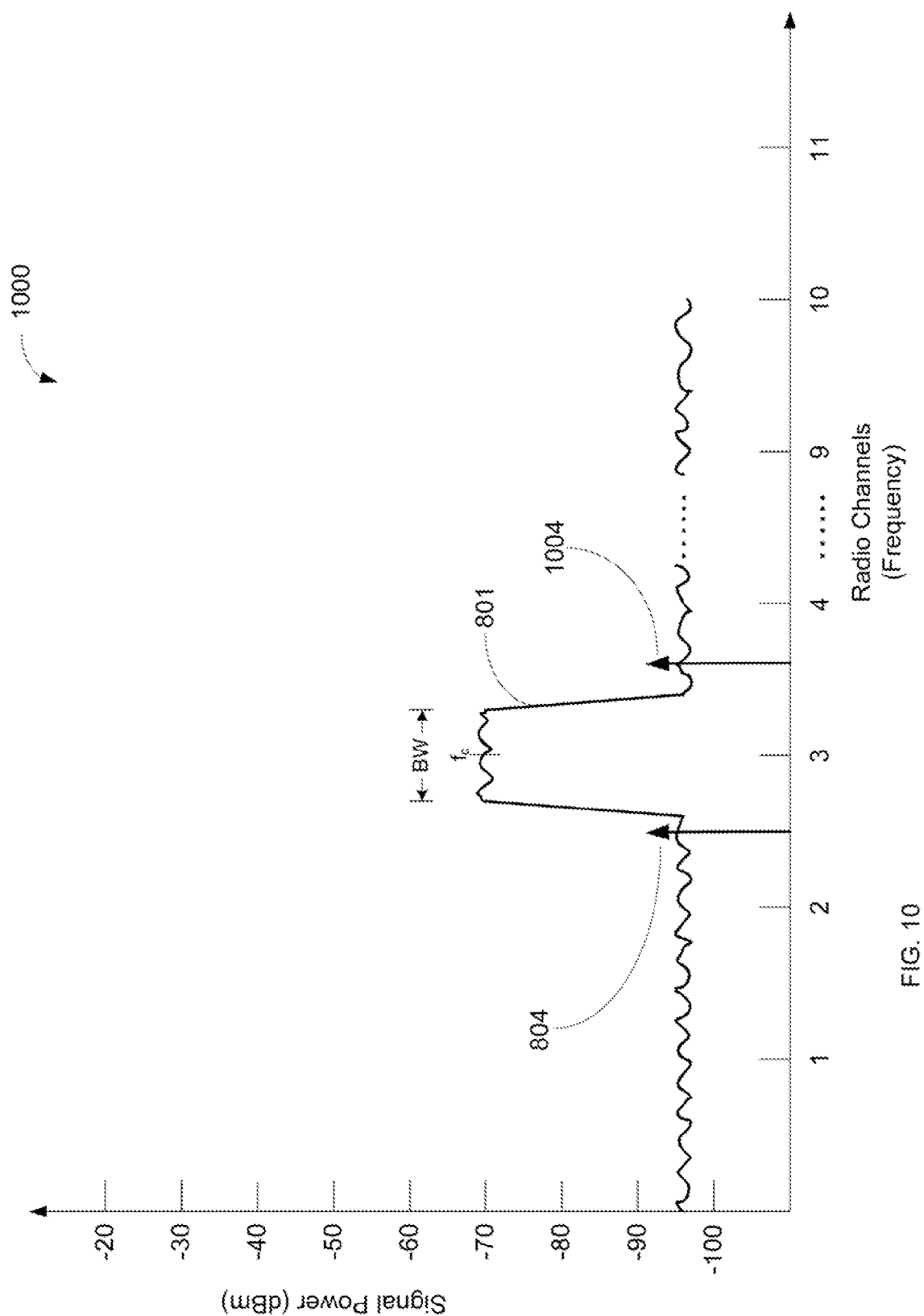
FIG. 10 illustrates the equivalent information as in FIG. 8, with the illustrated benefits of pass band tuning in accordance with an embodiment of the present invention.

By applying the principles of pass band tuning, the high selectivity RF circuit performance may be further improved. Consider the situation illustrated in FIG. 9 with frequency spectrum 900, wherein there are lesser interferers 704 and an additional interferer 904 that has slightly stronger signal power than lesser interferers 704. Additional interferer 904 has a signal power of approximately −77 dBm and lesser interferers 704 have signal power of approximately −92 dBm. With pass band tuning, the IF is shifted to a slightly higher or lower frequency in order to filter a desired band interferer signal. For example, referring to FIG. 9, frequency spectrum 900 illustrates that if the IF is shifted to a slightly lower frequency, then additional interferer 904 may be partially filtered from the desired band. As shown in FIG. 9, the IF is shifted from $f_c$ to $f_{shift}$ resulting in spectrum 903 to be shifted to a lower frequency than the spectrum 701 of the information signal. In this situation, additional interferer 904 is filtered such that its signal power is reduced from approximately −77 dBm to approximately −92 dBm. This result is illustrated in spectrum 1000 on FIG. 10 via additional interferer 1004. Hence, the desired channel spectrum has less distortion.

One method of implementing pass band tuning is to have the radio receiver 310 determine if there are lesser interferers 704 or an additional interferer 904 in the desired band in close proximity of the skirts of the selected channel filter of channel select filters 306, at either a higher frequency or lower frequency. If this condition is determined to exist, then the radio receiver 310 sends information on the control signal 319 that instructs the programmable local oscillator 302 to generate a control signal that is either slightly higher or slightly lower than the previously specified IF frequency. The value that the IF may shift varies depending on the specific design. As one example, pass band tuning may shift the IF from 5% to 20% of the IF frequency.

Pass band tuning is a compromise inasmuch as the shifted IF may push a signal up against the edge of the "real" filter. Likely the "real" filter has a gradual roll-off. In this case, one may find that while the desired signal suffers some distortion due to additional attenuation from the IF filter at the edge of the filter, there remains more benefit from the additional rejection of a stronger interferer.

High Selectivity RF Circuit Method

Figure 11:
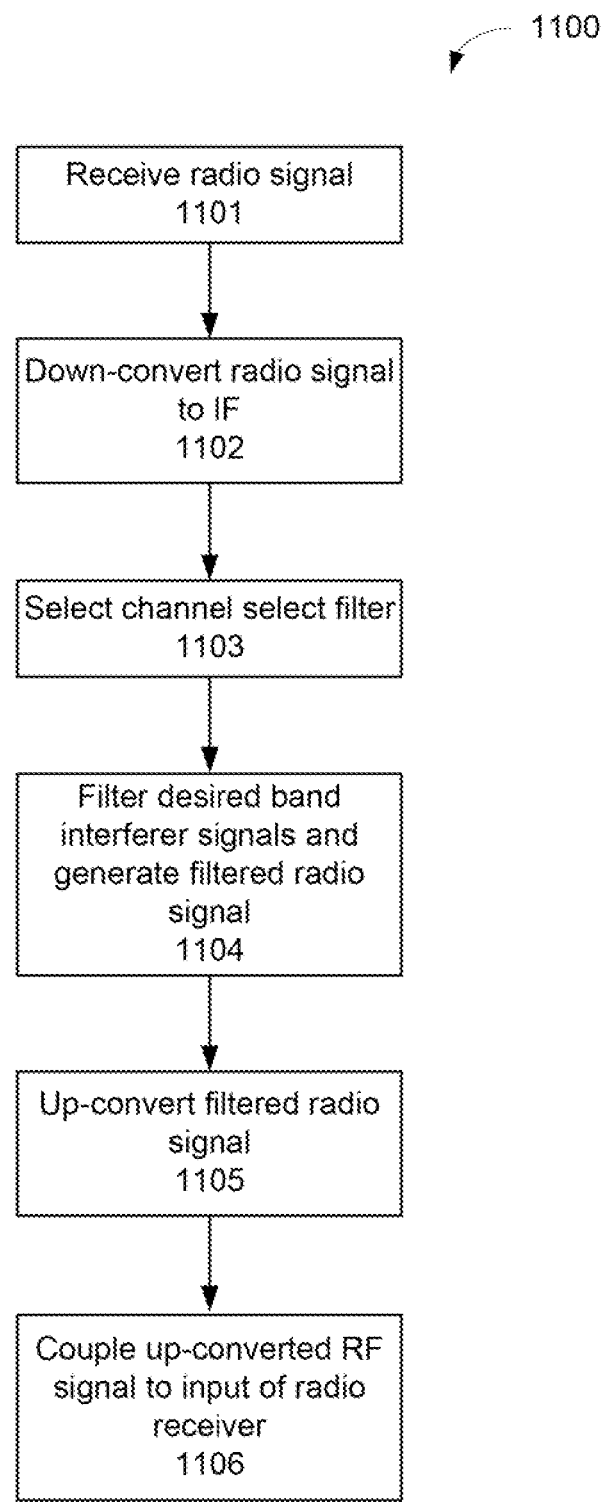
FIG. 11 illustrates a method for improving the performance of a radio receiver with a high selectivity RF circuit in accordance with an embodiment of the present invention.
Figure 12:
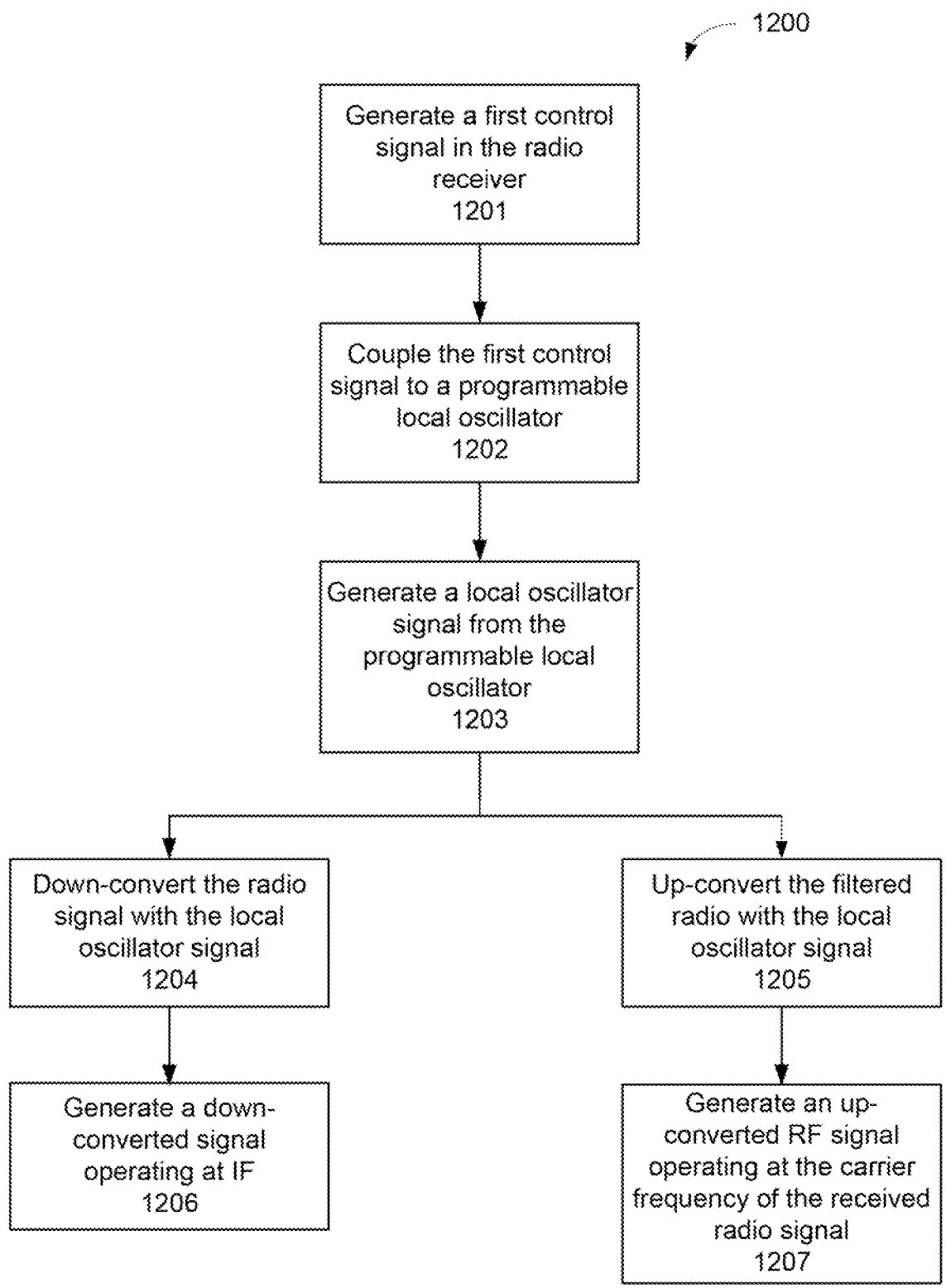
FIG. 12 illustrates the method of up-converting and down-converting in accordance with an embodiment of the present invention.
Figure 13:
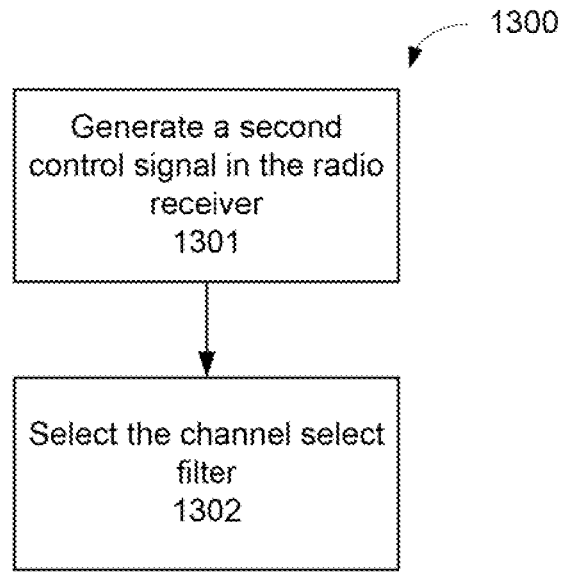
FIG. 13 illustrates the method of selecting a channel select filter in accordance with an embodiment of the present invention.

Via the high selectivity RF circuit, a method may be implemented to improve the performance of a radio receiver. This method for improving the performance of a radio receiver is illustrated in FIGS. 11, 12, 13, and 14, with flow charts 1100, 1200, 1300, and 1400, respectively. FIG. 11 with flow chart 1100 describes the steps of the method comprising steps 1101 to 1106. This method begins with the steps of receiving a radio signal, via the antenna 301, wherein the radio signal comprises a carrier frequency, an information signal, as represented by spectrum 601 and one or more desired band interferer signals such as strong interferer 602 and lesser interferers 604, as illustrated in FIG. 6; down-converting, via mixer 304, the radio signal to an intermediate frequency IF, via switch 305 and switch 307 selecting a channel select filter from a plurality of channel select filters 306; filtering one or more desired band interferer signals that are adjacent to a desired channel with the selected channel select filter and generating a filtered radio signal, as illustrated on FIG. 7; up-converting the filtered radio signal, via mixer 308, to an up-converted RF signal, as illustrated in FIG. 8; and coupling the up-converted RF signal to an input of the radio receiver 310.

The method for up-converting and down-converting is further described in flowchart 1200 and steps 1201 to 1207 and may comprise the steps of coupling a first control signal 319 generated in the radio receiver 310 to a programmable local oscillator 302, the first control signal 319 comprises information on the carrier frequency; and generating a local oscillator signal 317 from the programmable local oscillator 302 and coupling the local oscillator signal 317 to the down-converter mixer 304 and to the up-converter mixer 308.

The method may further comprises the steps of: down-converting, via mixer 304, the radio signal by mixing the radio signal 312 and the local oscillator signal 317 and generating a down-converted signal 313, as illustrated in FIG. 7; and up-converting, via mixer 308, by mixing the filtered signal 314, as filtered by channel select filters 306, and the local oscillator signal 317 and generating the up-converted RF signal 315, as illustrated in FIGS. 3A and 8, wherein the radio signal received by antenna 301 and the up-converted RF signal 315 have substantially the same carrier frequency. The down-converted signal operates at the intermediate frequency.

The method for selecting a channel select filter is further described in flowchart 1300 and steps 1301 and 1302 and comprises the steps of selecting the channel select filter, from channel select filters 306, based on a second control signal 318 from the radio receiver 310, wherein the second control signal 318 comprises information on bandwidth of the desired channel.

Additionally, the channel select filters 306 may be SAW filters, and for IEEE 802.11, the channel select filters may comprise filters that have bandwidths whose values are substantially equal to 5, 10, 20, and 40 MHz and have a center frequency that is substantially equal to the intermediate frequency of the high selectivity RF circuit. (Not shown in flowcharts.)

The method may further comprise the step of tuning the selectable channel filter with pass band tuning. (Not shown in flowcharts.)

The method further comprises the steps of: filtering the radio signal 311 with a first out-of-band filter 303; and filtering the up-converted RF signal 315 with a second out-of-band filter 309, wherein the first out-of-band filter 303 and second out-of-band filter 309 provide substantially the same filter. (Not shown in flowcharts.)

Figure 14:
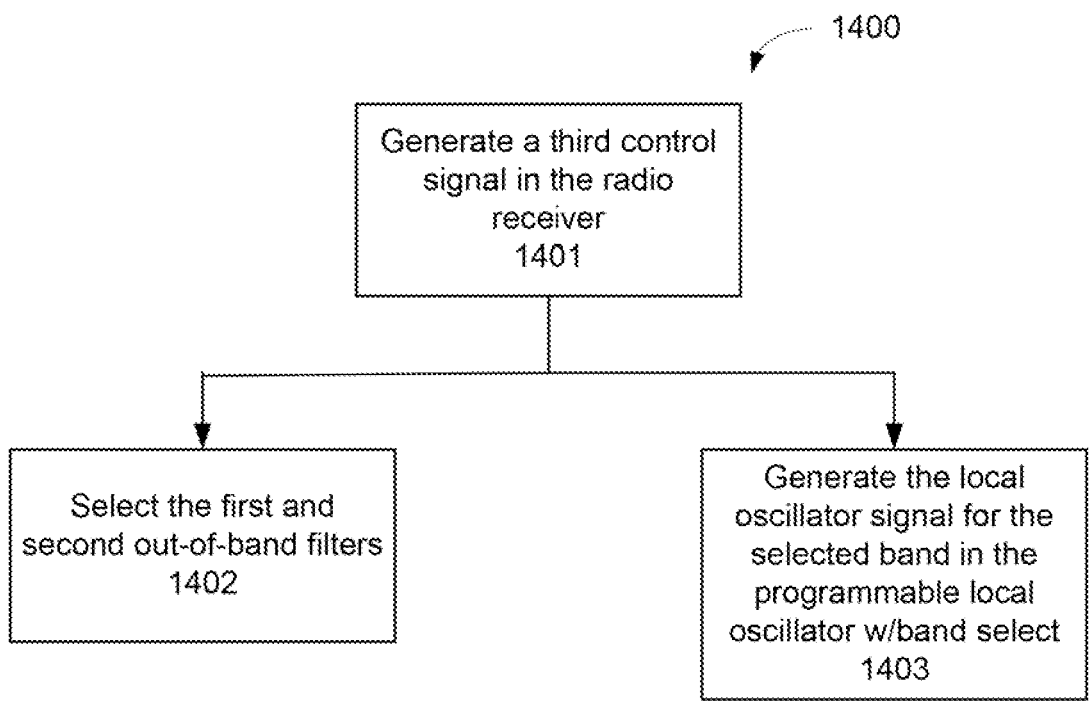
FIG. 14 illustrates the method of selecting a desired band in accordance with an embodiment of the present invention.

The method for selecting the desired band (i.e. frequency band) is illustrated in FIG. 14 with steps 1401 to 1403. The frequency band for the first out-of-band filter 303 and second out-of-band filter 309 may be selectable by a third control signal 360 generated by the radio receiver, as illustrated in FIG. 3B with band select filters 353 and 359. The third control signal 360 is also utilized to generate the local oscillator signal 317 for the desired band by the programmable local oscillator w/band select 352.

High Selectivity RF Circuit System

A system for improving the performance of a radio receiver comprises an antenna 301 that receives a radio signal; a high selectivity RF circuit 375 that comprises a down-converter mixer 304, channel select filters 306, and an up-converter mixer 308; and a radio receiver 310, wherein the radio receiver 310 provides control signals that permits the selection of a channel select filter and permits generation of a local oscillator signal 317, wherein the local oscillator signal 317 mixes with the radio signal 312, via mixer 304 to generate an intermediate frequency, and wherein the intermediate frequency is the center frequency of the selected channel of channel select filters 306, wherein a down-converted signal 313 is filtered by the selected channel select filter to generate a filtered signal 314, then the filtered signal 314 is up-converted, via mixer 308 to a up-converted RF signal 315 that has a carrier frequency that is substantially the same as the radio signal 311, wherein the up-converted RF signal 315 is coupled to an input of the radio receiver 310.

While various embodiments of the invention have been described, it will be apparent to those of ordinary skill in the art that many more embodiments and implementations are possible that are within the scope of this invention. For example, any combination of any of the systems or methods described in this disclosure is possible. Further, these concepts may apply to any radio system.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A device comprising:
   a down-converter operative to receive a first RF signal and generate a second RF signal;
   one or more channel select switches coupled to a plurality of filters, said switches operative to direct the second RF signal to at least one of said filters;
   a programmable oscillator, said oscillator coupled to the down converter;
   a receiver coupled to the oscillator, said receiver operable to provide a control signal to the oscillator, said control signal indicative of an interference signal substantially near the skirts of one of said filters;
   wherein the control signal operates to change the oscillator frequency, having the effect that the frequency of the second RF signal is shifted;
   wherein the control signal is further operable to select for a filter having a center frequency different from the center frequency of the second RF signal, and
   an up-converter, coupled to the channel select switches and operative to generate a third RF signal.

2. The device of claim 1 wherein said frequency shift lowers the affect of the interference signal.

3. The device of claim 1 further comprising:
   a first out-of-band filter coupled to the input of the down convertor, and
   a second out-of-band filter coupled to the output of the up-convertor.

4. The device of claim 1 wherein the control signal further comprises bandwidth information of a desired channel.

5. The device of claim 1 wherein the filters are SAW filters.

6. The device of claim 1 wherein the filters comprise filters that have bandwidths whose values are substantially equal to 5, 10, 20, and 40 MHz and have a center frequency that is substantially equal to the second RF signal.

7. A method comprising:
   receiving a radio signal, wherein the radio signal comprises at least a carrier frequency;
   down-converting the radio signal to an intermediate frequency signal;
   determining the presence of an interfering signal;
   changing the intermediate frequency signal in response to said determining;
   selecting a filter in response to said determining;
   directing the intermediate frequency signal to the filter, said filter having a center frequency different from the intermediate frequency;
   up-converting the intermediate frequency signal, and
   coupling the up-converted signal to a radio receiver,
   wherein the radio receiver detects the presence of the interfering signal.

8. The method of claim 7 further comprising:
   filtering the input of a down convertor, and
   filtering the output of a up-convertor.

9. The method of claim 7 wherein the filtering is done with SAW filters.

* * * * *